United States Patent Office 3,795,696
Patented Mar. 5, 1974

3,795,696
ALKYNYLBENZYL CYCLOPROPANE-
CARBOXYLATES
Yoshio Katsuda, Osaka, and Toru Kawanami, Kobe, Japan, assignors to Sumitomo Chemical Company, Limited, and Dainippon Jochugiku Co., Ltd., both of Osaka, Japan
No Drawing. Filed June 3, 1971, Ser. No. 149,841
Claims priority, application Japan, June 13, 1970, 45/51,442
Int. Cl. C07c 69/74
U.S. Cl. 260—468 H                5 Claims

ABSTRACT OF THE DISCLOSURE

Novel cyclopropanecarboxylic acid esters represented by the formula,

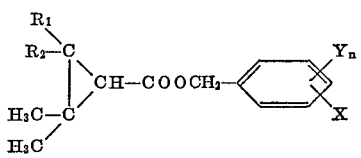

wherein when $R_1$ is hydrogen atom, $R_2$ is methyl group, isobutenyl group, or 2-carbomethoxy-1-propenyl group, and when $R_1$ is methyl group, $R_2$ is methyl group; X is a lower alkynyl group; Y is hydrogen atom, methyl group, methoxy group, or chlorine atom; and $n$ is 1 or 2; provided that the case where Y and $R_1$ are hydrogen atom, $R_2$ is isobutenyl group, and X is propargyl group is excluded. The compound is used as an insecticide having low toxicity but not harmful to mammals and is produced at low cost.

---

This invention relates to novel benzyl cyclopropanecarboxylates represented by the following formula and a process for producing the same:

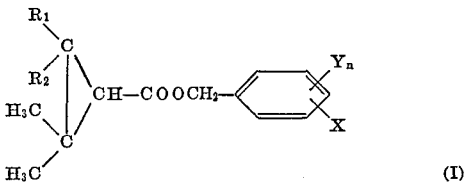
(I)

wherein when $R_1$ is hydrogen atom, $R_2$ is methyl group, isobutenyl group, or 2-carbomethoxy-1-propenyl group, and when $R_1$ is methyl group, $R_2$ is methyl group; X is a lower alkynyl group; Y is hydrogen atom, methyl group, methoxy group, or chlorine atom; and $n$ is 1 or 2; provided that the case where Y and $R_1$ are hydrogen atom, $R_2$ is isobutenyl group, and X is propargyl group is excluded.

This invention also relates to an insecticidal composition having low toxicity and no harmfulness to mammals, and having a prominent insecticidal activity suitable for the control of household insects and for uses in agriculture and horticulture, and relates to a process for producing said insecticidal composition.

As an insecticide having a prominent knock down and killing activity against insects without harmfulness to mammals, there have been used, heretofore, a pyrethrum extract and pyrethrin, and more recently, homologues of pyrethrin such as allethrin, 3,4,5,6-tetrahydrophthalimidomethyl chrysanthemate (hereinafter referred to as "tetramethrin"), and the like. Both of these natural and synthetic products, however, have each disadvantages which cause various problems in practical use.

As a result of an extensive research, the present inventors have found a novel type ester of cyclopropanecarboxylic acid which has far superior insecticidal activity and is able to be synthesized at a lower cost compared with pyrethrin and its homologues. Based on these findings the present invention has been accomplished.

An object of the present invention is to provide a novel ester which has an insecticidal activity superior to the conventional product, and, moreover, is available at a low cost.

The novel esters of the Formula I includes a stereoisomer due to the configuration of the cyclopropanecarboxylic acid moiety, and an optical isomer due to the asymmetric carbon atom, such as, for example, d-trans-chrysanthemum-monocarboxylic acid ester.

Among the compounds represented by the Formula I, examples of particularly useful compounds are given below, but the present invention is, needless to say, not limited to these examples.

| Compound No. | Structure |
|---|---|
| 1 | HC≡C-CH₂-[2,6-diMe-phenyl]-CH₂O-C(=O)-CH—C(CH₃)₂-CH=C(CH₃)(H) — 2,6-dimethyl-4-propargylbenzyl chrysanthemate |
| 2 | HC≡C-CH₂-[phenyl]-CH₂O-C(=O)-CH—C(CH₃)₂-CH=C(CH₃)(COOCH₃) — 4-propargylbenzyl pyrethrate |
| 3 | HC≡C-[3-MeO-phenyl]-CH₂O-C(=O)-CH—C(CH₃)₂-CH=C(CH₃)₂ — 3-methoxy-4-ethinylbenzyl chrysanthemate |
| 4 | H₃C-C≡C-CH₂-[phenyl]-CH₂O-C(=O)-CH—C(CH₃)₂-CH=C(CH₃)₂ — 4-(2′-butinyl)benzyl chrysanthemate |
| 5 | H₃C-C≡C-CH₂-[2,6-diMe-phenyl]-CH₂O-C(=O)-CH—C(CH₃)₂-CH=C(CH₃)(COOCH₃) — 2,6-dimethyl-4-(2′-butinyl)benzyl pyrethrate |
| 6 | CH≡C-CH₂-[2-Me-phenyl]-CH₂O-C(=O)-CH—C(CH₃)₃ (trimethylcyclopropane) — 2-methyl-4-propargylbenzyl 2′,2′,3′-trimethylcyclopropane-carboxylate |
| 7 | CH≡C-[3,5-diMeO-phenyl]-CH₂O-C(=O)-CH—C(CH₃)₃ — 3,5-dimethoxy-4-ethinylbenzyl 2′,2′,3′-trimethylcyclopropane-carboxylate |

TABLE—Continued

| Compound No. | Structure |
|---|---|
| 8 | 2,6-dimethyl-4-propargylbenzyl 2',2',3',3'-tetramethylcyclopropanecarboxylate |
| 9 | 4-(2''-butinyl)benzyl 2',2',3',3'-tetramethylcyclopropanecarboxylate |
| 10 | 3-methoxy-4-propargylbenzyl 2',2',3',3'-tetramethylcyclopropanecarboxylate |
| 11 | 2,6-dichloro-4-propargylbenzyl 2',2',3',3'-tetramethylcyclopropanecarboxylate |
| 12 | 3-propargylbenzyl 2',2',3'-trimethylcyclopropanecarboxylate |
| 13 | 4-propargylbenzyl 2',2',3',3'-tetramethylcyclopropanecarboxylate |

The cyclopropanecarboxylic acid esters represented by the Formula I exhibit a prominent insecticidal activity against houseflies, mosquitoes, cockroaches and other house-hold insects, and in addition against pantry pests and are also useful in agriculture and horticulture. They are used safely because of their low toxicity to mammals.

The cyclopropanecarboxylic acid esters represented by the Formula I, first synthesized by the present inventors, may be produced easily and in high yields. For instance, they may be produced by reacting a benzyl alcohol derivative of the formula,

(II)

wherein X, Y and $n$ have the same meanings as defined above, and A is a halogen atom, hydroxyl group or tosyloxy group, with a cyclopropanecarboxylic acid of the following formula or with a reactive derivative thereof

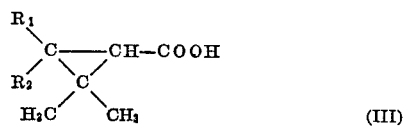

(III)

wherein $R_1$ and $R_2$ are the same as defined above, if necessary in the presence of a reaction auxiliary agent.

The proper choice in the type of benzyl alcohol derivatives represented by the Formula II depends upon the type of the other reactant, that is, a cyclopropanecarboxylic acid of the Formula III or a reactive derivative thereof. As the reactive derivative of the carboxylic acid of the Formula III there are used a corresponding acid halide, acid anhydride, lower alkyl ester, alkali metal salt, and the like. The embodiments of the present process for synthesizing the compounds of the Formula I are illustrated below.

The first method comprises reacting a benzyl alcohol derivative represented by the formula,

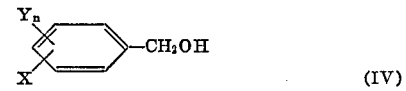

(IV)

wherein X, Y and $n$ are as defined above, with a cyclopropanecarboxylic acid of the Formula III or its halide, anhydride, or lower alkyl ester, to obtain the ester of the present invention. When a free cyclopropanecarboxylic acid is used, the reaction is effected under a dehydrating condition, that is, in the presence of a dehydration catalyst such as a mineral acid or p-toluene-sulfonic acid, or in the presence of an azeotropic dehydration solvent such as benzene or toluene. Alternatively, the reaction is effected in the presence of a dehydration agent such as dicyclohexylcarbodiimide in an inert solvent such as benzene or petroleum ether with or without heating.

When a cyclopropanecarboxylic acid halide is used, the reaction can be effected at room temperature in the presence of an organic tertiary base such as pyridine or triethylamine as a dehydrogen halide agent. As the acid halide any halide may be used, but ordinarily a chloride is used. In this case a solvent such as benzene, toluene or petroleum benzine is preferably used in order that the reaction proceeds smoothly.

When a cyclopropanecarboxylic acid anhydride is used, the reaction may be conducted in the absence of a reaction auxiliary agent, to yield the ester of the Formula I of the present invention. In this case it is preferable to heat the reaction mixture and to use a solvent for the reaction to proceed smoothly.

When a lower alkyl ester of cyclopropanecarboxylic acid is used, the reaction may be effected by heating in the presence of a basic catalyst such as a sodium alkoxide, and the reaction may proceed more smoothly by use of a solvent. As the preferable lower alkyl esters used in the present invention, may be cited methyl ester, ethyl ester, n-propyl ester or isopropyl ester of the carboxylic acid of the Formula III.

In the second method of the present process, a benzyl halide derivative of the formula,

(V)

wherein X, Y and $n$ are the same as defined above and B is a halogen atom, is reacted with an alkali metal salt or a tertiary amine salt of the cyclopropanecarboxylic acid of the Formula III. In this case, said alkali metal salt or tertiary amine salt may be formed in the reaction system by the reaction with a corresponding base. The reaction is effected preferably in the presence of an inert solvent such as benzene, acetone, and the like, at a temperature of the boiling point or below the boiling point of the solvent. As the halogen atom represented by B in the Formula V, chlorine or bromine atom is commonly used, though other halogen atoms may be used when required.

In the third method of the present process, a benzyl alcohol tosylate of the formula,

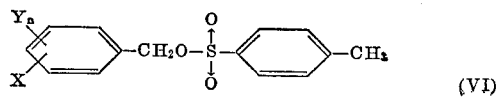

(VI)

wherein X, Y and $n$ are the same as defined above, is reacted with an alkali metal salt or a tertiary amine salt of the cyclopropanecarboxylic acid of the Formula III, in a manner similar to that in the second method of the present invention, to yield the ester of the Formula I.

The cyclopropanecarboxylic acid of the Formula III may be produced in the known way, and, if necessary, its reactive derivative may be produced also in the known way. The alcohol represented by the Formula IV may be prepared by, for example, a series of reactions consisting of synthesis of 4-(2'-propinyl) benzaldehyde acetal by the reaction of a Grignard's reagent derived from 2,6-dimethyl-4-bromobenzaldehyde acetal with 2-propinylmethanesulfonate, subsequent splitting of acetal group, and further reduction with sodium borohydride or the like. The alcohol thus obtained is halogenated to yield a derivative of benzylhalide, or reacted with p-toluenesulfonic acid chloride to yield a tosylate.

Insecticidal compositions comprising the novel ester of the Formula I can be formulated in various forms including oil spray, emulsifiable concentrate, dust, wettable powder, aerosol, mosquito coil, fumigant, granule, bait, luring dust, and solid preparation. The techniques used in formulating a pyrethrum extract, allethrin, and the like, are applicable to the formulation of said compositions. Additives and carriers used in conventional insecticidal preparations are also used in the present compositions. Xylene and methylnaphthalene may be used as the organic solvent for oil sprays.

The activity of the insecticidal compositions thus obtained can be further enhanced by the addition of one of the synergists for pyrethroids, such as, for example, 3,4-methylenedioxy - 6 - propylbenzylbutyldiethylene glycol ether (hereinafter referred to as "piperonyl butoxide"), 1,2 - methylenedioxy - 4 - [2 - (octylsulfinyl)-propyl]-benzene (hereinafter referred to as "sulfoxide"), N-(ethylhexyl) - bicyclo[2,2,1] - hepta - 5 - ene-2,3-dicarboximide (hereinafter referred to as "MGK–264," the trademark of McRolin Gormley King Co.), N-(4-pentynyl)-phthalimide, O-n-propyl-O-propargylphenyl phosphate (hereinafter referred to as "NIA–16388") or bis-(2,3,3,3-tetrachloropropyl) ether. In formulating the present compound as a mosquito coil, terephthalic acid, isophthalic acid, or butyl hydroxytoluene (hereinafter referred to as "BHT") can be added to enhance the activity. Further, the present compound may be formulated as a multipurpose preparation by combining with other pyrethroids, such as, for example, pyrethrum extract, allethrin, tetramethrin, 5-benzyl-3-furylmethyl chrysanthemate (hereinafter referred to as "Chrysron"), or the like. Other insecticides, which can be used in combination with the present compound, include organochlorine insecticides, such as dichlorodiphenyltrichloroethane (hereinafter referred to as "DDT"), benzene hexachloride (hereinafter referred to as "BHC") and methoxychlor; organophosphorus insecticides such as O,O-dimethyl O-(3-methyl-4-nitrophenyl) phosphorothioate (hereinafter referred to as "Fenitrothion") and O,O-dimethyl O-(2,2-dichlorovinyl) phosphate (hereinafter referred to as "DDVP"); and carbamate insecticides such as 1-naphthyl-N-methylcarbamate and 3,4-xylyl-N-methylcarbamate. Other insecticides, miticides, herbicides, fertilizers, and the other agricultural chemicals can also be used in combination with the present compound.

The effects of the present invention are further illustrated by the following examples, but the invention is, needless to say, not limited to the examples.

EXAMPLES

Preparation of the cyclopropanecarboxylic acid esters

Examples of the esters included in the present invention are as shown in Table 1. These esters are synthesized by the following standard methods of preparation, A, B, C, D, E and F.

Method A: Reaction of the alcohol of the Formula IV with a carboxylic acid halide.—0.05 mole of the alcohol is dissolved in three times its volume of dry benzene, and the solution was added with 0.075 mole of pyridine. Upon adding to the solution 0.053 mole of the carboxylic acid chloride dissolved in three times its volume of dry benzene, the reaction commenced and proceeded with evolution of heat. After being left standing overnight in a tightly stoppered vessel, the reaction mixture was added with a small amount of water to dissolve the pyridine hydrochloride contained therein, and then the aqueous layer was removed after settling. The oil layer was washed successively with an aqueous 5% (weight) hydrochloric acid, a saturated aqueous solution of sodium bicarbonate, and a saturated aqueous sodium chloride solution, and then dried over anhydrous sodium sulfate. The benzene was removed by distillation to yield an oily substance which was purified by a silica-gel chromatography to obtain the final product.

Method B: Dehydration reaction between the alcohol of the Formula IV and the carboxylic acid of the Formula III.—0.05 mole of the alcohol and 0.05 mole of the carboxylic acid were dissolved in three times their volume of benzene, and 0.08 mole of dicyclohexylcarbodiimide was added thereto with stirring. After being left standing overnight in a stoppered vessel, the reaction mixture was boiled under reflux for 2 hours, and then treated in the same manner as in the method A, to obtain the desired ester.

Method C: Reaction of the alcohol of the Formula IV with a carboxylic acid anhydride.—0.05 mole of the alcohol was dissolved in three times its volume of toluene, and to the solution was added 0.055 mole of a carboxylic acid anhydride obtained by reacting the carboxylic acid of the Formula III with acetic anhydride, whereupon the solution was heated at 100° C. for 3 hours to complete the reaction. After being cooled, the reaction mixture was neutralized with a 10% aqueous sodium hydroxide solution at a temperature below 10° C. Unreacted carboxylic acid is recovered from the aqueous layer. The oil layer was treated in the same manner as in the method A to obtain the desired ester.

Method D: Ester exchange reaction between the alcohol of the Formula IV and a lower alkyl ester of the carboxylic acid.—0.06 mole of ethyl ester of the carboxylic acid of the Formula III and 0.05 mole of the alcohol were dissolved in five times their volume of dry toluene, and to the solution was added 0.005 mole of sodium ethoxide. After being thoroughly mixed with stirring, the reaction mixture was boiled under reflux for 10 hours. The ethanol formed by the reaction was removed from the reaction mixture by azeotropic distillation and water was cautiously added to the mixture. The oil layer was treated in the same manner as in the method A, to obtain the desired ester.

Method E.—Reaction of the halide of the Formula V with the carboxylic acid of the Formula III.—0.05 mole of the halide and 0.06 mole of the carboxylic acid were dissolved in three times their volume of water, and to the solution 0.08 mole of triethylamine dissolved in three times its volume of acetone was added drop by drop over a period of one hour with stirring at 20° C. After the addition, the reaction mixture was boiled under reflux for two hours, and then allowed to cool by standing as it is. The precipitated triethylamine hydrochloride is filtered off, and the filtrate is freed from the acetone by distillation. To the residue were added three times its volume of benzene, and the resulting oil layer was treated in the same manner as in the method A, to obtain the desired ester.

Method F: Reaction of the tosylate of the Formula VI with a salt of the carboxylic acid of the Formula III.—0.05 mole of the tosylate was dissolved in three times its volume of acetone, and to the solution was added with stirring sodium salt of the carboxylic acid during a period of 30 minutes said sodium salt being prepared by reacting the carboxylic acid with sodium hydroxide in water and then removing the water by evaporation. After the addition of sodium salt of the carboxylic acid, said solution was boiled under reflux for further 30 min. to complete the reaction, and then allowed to cool. The precipitates formed were filtered off and the filtrate was freed from the acetone by distillation. The residue was dissolved in three times its volume of benzene, and the resulting oil layer was treated in the same manner as in the method A, to obtain the desired ester.

The esters obtained by the above standard procedures are shown in Table 1 together with the starting materials.

EXAMPLE 16

0.07 part of each of the present Compounds 2, 6, 8, 9, 11 and 12, 0.03 part of Chrysron and 0.5 part of sulfoxide were dissolved in deodorized kerosene, to obtain 100 parts of respective oil spray.

EXAMPLE 17

20 parts of each of the present Compounds 1, 2, 3 and 4, 5 parts of Fenitrothion, and 10 parts of Sorpol SM–200 (tradename; Toho Chemical Co.), and 65 parts of xylene were mixed with good stirring, to obtain respective emulsifiable concentrate.

TABLE 1

| | Starting material | | | Cyclopropanecarboxylate | | | | | |
|---|---|---|---|---|---|---|---|---|---|
| Example number | Benzyl alcohol derivative | Cyclopropane-carboxylic acid or its derivative | Method | Compound | Theoretical yield, percent | Refractive index $n_D^{25}$ | Elementary analysis, percent | | |
| | | | | | | | C | H | C |
| 1 | 2,6-dimethyl-4-propargyl benzyl alcohol. | dl-cis, Trans-chrysanthemum monocarboxylic acid chloride. | A | 2,6-dimethyl-4-propargyl benzyl chrysanthemate. | 91 | 1.5201 | Found 82.2  Calculated 81.4 (for $C_{22}H_{28}O_2$) | 8.65  8.69 | |
| 2 | 4-propargyl benzyl chloride. | Pyrethric acid | E | 4-propargyl benzyl pyrethrate. | 82 | 1.5398 | Found 74.4  Calculated 74.1 (for $C_{21}H_{24}O_4$) | 7.04  7.10 | |
| 3 | 3-methoxy-4-ethinyl benzyl alcohol. | dl-cis, Trans-chrysanthemum monocarboxylic acid chloride. | A | 3-methoxy-4-ethinyl benzyl chrysanthemate. | 90 | 1.5150 | Found 77.1  Calculated 76.9 (for $C_{20}H_{24}O_3$) | 7.79  7.74 | |
| 4 | 4-(2'-butinyl)benzyl tosylate. | Sodium dl-cis, trans-chrysanthemate. | F | 4-(2'-butinyl)benzyl chrysanthemate. | 86 | 1.5200 | Found 81.5  Calculated 81.2 (for $C_{21}H_{26}O_2$) | 8.40  8.44 | |
| 5 | 2,6-dimethyl-4-(2'-butinyl)benzyl alcohol. | Pyrethric acid chloride. | A | 2,6-dimethyl-4-(2'-butinyl) benzyl pyrethrate. | 93 | 1.5257 | Found 75.5  Calculated 75.4 (for $C_{24}H_{30}O_4$) | 7.88  7.90 | |
| 6 | 2-methyl-4-propargyl benzyl alcohol. | dl-2,2,3-trimethyl cyclopropane carboxylic acid. | B | 2-methyl 4-propargyl benzyl 2',2',3'-trimethyl cyclopropane carboxylate. | 83 | 1.5140 | Found 79.4  Calculated 80.0 (for $C_{18}H_{22}O_2$) | 8.26  8.20 | |
| 7 | 3,5-dimethoxy-4-ethinyl benzyl alcohol. | dl-2,2,3-trimethyl cyclopropane carboxylic acid chloride. | A | 3,5-dimethoxy-4-ethinyl benzyl 2',2',3'-trimethyl cyclopropane carboxylate. | 88 | 1.5291 | Found 76.1  Calculated 75.5 (for $C_{18}H_{22}O_3$) | 7.78  7.74 | |
| 8 | 2,6-dimethyl-4-propargyl benzyl alcohol. | dl-2,2,3,3-tetramethyl cyclopropane carboxylic acid anhydride. | C | 2,6-dimethyl-4-propargyl benzyl 2',2',3',3'-tetramethyl cyclopropane carboxylate. | 89 | 1.5161 | Found 81.3  Calculated 80.5 (for $C_{20}H_{26}O_2$) | 8.75  8.78 | |
| 9 | 4-(2''-butinyl)benzyl alcohol. | dl-2,2,3,3-tetramethyl cyclopropane carboxylic acid chloride. | A | 4-(2''-butinyl)benzyl 2',2',3',3'-tetramethyl cyclopropane carboxylate. | 92 | 1.5157 | Found 81.0  Calculated 80.2 (for $C_{19}H_{24}O_2$) | 8.44  8.50 | |
| 10 | 3-methoxy-4-propargyl benzyl alcohol. | ...do... | A | 3-methoxy-4-propargyl benzyl 2',2',3',3'-tetramethyl cyclopropane carboxylate. | 91 | 1.5214 | Found 75.8  Calculated 76.0 (for $C_{19}H_{24}O_3$) | 8.01  8.05 | |
| 11 | 2,6-dichloro-4-propargyl benzyl alcohol. | ...do... | A | 2,6-dichloro-4-propargyl benzyl 2',2',3',3'-tetramethyl cyclopropane carboxylate. | 94 | 1.5297 | Found 62.9  Calculated 63.7 (for $C_{18}H_{20}O_2Cl_2$) | 5.95  5.94 | 20.1  20.9 |
| 12 | 3-propargyl benzyl alcohol. | Ethyl dl-2,2,3-trimethyl cyclopropane carboxylate. | D | 3-propargyl benzyl 2',2',3'-trimethyl cyclopropane carboxylate. | 81 | 1.5279 | Found 79.3  Calculated 79.7 (for $C_{17}H_{20}O_2$) | 7.83  7.86 | |
| 13 | 4-propargyl benzyl alcohol. | dl-2,2,3,3-tetramethyl cyclopropane carboxylic acid chloride. | A | 4-propargyl benzyl 2',2',3',3'-tetramethyl cyclopropane carboxylate. | 92 | 1.5134 | Found 80.7  Calculated 80.0 (for $C_{18}H_{22}O_2$) | 8.16  8.20 | |

The method of preparation and the effect of the present compositions are illustrated by the following examples and test examples. In the examples the names of the compounds are represented by the numbers of the compounds given hereinbefore.

EXAMPLE 14

0.2 part of each of the present Compounds 1 to 13 was dissolved in deodorized kerosene to obtain 100 parts of respective oil spray.

EXAMPLE 15

0.05 part of each of the present Compounds 1, 3, 4, 5, 7 and 10, 0.05 part of tetramethrin and 0.5 part of piperonyl butoxide were dissolved in deodorized kerosene, to obtain 100 parts of respective oil spray.

EXAMPLE 18

0.6 gram of each of the present Compounds 1 (a d-trans-chrysanthemate isomer), 6, 8, 9, 11 and 13, and 1.8 gr. of BHT were dissolved in 20 ml. of methanol, and the solution was mixed with stirring uniformly with 97.6 gr. of a carrier for mosquito coil (a mixture of "Tabu" powder, marc, and wood powder in a ratio of 3:5:1 respectively). The mixture was freed from methanol, added with 150 ml. of water, kneaded thoroughly, moulded, and dried to obtain respective mosquito coil.

EXAMPLE 19

0.3 gram of each of the present Compounds 1, 7, 9, 10, 12 and 13, and 0.3 gr. of allethrin were dissolved in 20 ml. of methanol, and the solution was treated in the same way as in Example 18, to obtain respective mosquito coil.

EXAMPLE 20

0.2 part of the present Compound 1, 1.0 part of a pyrethrum extract (containing 20% of pyrethrins), 2.0 parts of piperonyl butoxide, 5.8 parts of xylene, and 6 parts of deodorized kerosene were mixed into a solution. The solution was filled in an aerosol container, and the valve part was attached to the container. 85 parts of a propellant (a liquefied petroleum gas) was then filled through the valve under pressure, to obtain an aerosol.

EXAMPLE 21

0.2 part of the present Compound 2, 0.2 part of tetramethrin, 0.5 part of Fenitrothion, 7 parts of xylene, and 7.1 parts of deodorized kerosene were mixed into a solution, and the solution was filled in an aerosol container in the same way as in Example 20, to obtain an aerosol.

EXAMPLE 22

0.3 part of the present Compound 12, 0.15 part of Chrysron, 13.55 parts of deodorized kerosene, and 1 part of an emulsifier, "Atmos 300" (registered trademark; Atlas Chemical Industries, Inc.), were mixed and emulsified with 50 parts of purified water. The resulting mixture was filled in an aerosol container together with 35 parts of a mixture of deodorized butane and deodorized propane in a ratio of 3:1, to obtain a water-based aerosol.

EXAMPLE 23

0.2 gram of each of the present Compounds 8 and 13 and 0.1 gr. of allethrin (d-transchrysanthemate isomer) were dissolved in an appropriate amount of chloroform. The solution was adsorbed on the surface of an asbestos sheet of 2.5 cm. x 1.5 cm. in size and 0.3 mm. in thickness, and another asbestos sheet of the same size was pasted thereon, to obtain a fiber-supported insecticidal fumigant preparation to be used on an electric heating plate. Beside asbestos, there may be used other fibrous supports having the equivalent effect, such as pulp, wooden plate, or the like.

EXAMPLE 24

One part of each of the present Compounds 1 and 13, and 1 part of 3,4 - xylyl - N - methylcarbamate were dissolved in 20 parts of acetone, and to the solution was added 98 parts of a diatomacious earth of 300 mesh in particle size. After being thoroughly agitated and mixed in a mortar, the mixture was freed from the acetone by evaporation, to obtain respective dust preparation.

EXAMPLE 25

Five parts of the present Compound 1, 15 parts of piperonyl butoxide, 5 parts of "Toyo-Lignin CT" (registered trademark; Toyo Spinning Co.) and 75 parts of "GMS Clay" (registered trademark; Geeklite Mining Co.) were thoroughly agitated and mixed in a mortar. To the mixture was added 10% of water based on its weight, and the mixture was further agitated and mixed, then granulated by a granulator, and dried in an air draft to obtain a granule prepartion.

EXAMPLE 26

25 parts of the present Compound 11 and 5 parts of "Sorpol SM–200" (the same as used above) were thoroughly mixed, added with 70 parts of talc of 300 mesh in particle size, and thoroughly agitated and mixed in a mortar, to obtain a wettable powder.

The insecticidal effects of the present compositions thus obtained were as shown in the following test examples:

TEST EXAMPLE 1

The insecticidal activities of oil spray preparations obtained in Example 14 were tested by Campbell's turntable method [Soap and Sanitary Chemicals, vol. 14, No. 6, p. 119 (1938)]. Five milliliters of each preparation was sprayed, and a group of about 100 housefly adults was exposed to the settling mist of each preparation. After 10 min. of exposure, the flies were taken out, the number of knocked down flies were observed, and fed in another observation vessel placed in a constant temperature room at 27° C. After 24 hrs. the alive and dead were observed. The result obtained were as shown in Table 1.

TABLE 1

| Composition | Knock-down after 10 min., percent | Mortality, percent |
|---|---|---|
| 0.2% oil spray of the compound: | | |
| (1) | 100 | 100 |
| (2) | 100 | 74 |
| (3) | 90 | 85 |
| (4) | 100 | 98 |
| (5) | 100 | 100 |
| (6) | 100 | 90 |
| (7) | 100 | 81 |
| (8) | 100 | 100 |
| (9) | 100 | 100 |
| (10) | 100 | 94 |
| (11) | 100 | 100 |
| (12) | 100 | 88 |
| (13) | 100 | 100 |
| 0.2% oil spray of allethrin (control) | 100 | 68 |

TEST EXAMPLE 2

About 50 housefly adults were released in a glass chamber, 70 cm. x 70 cm. x 70 cm. in size, and 0.7 ml. of each of the oil spray preparation obtained in Examples 15 and 16 was sprayed therein by means of a glass atomizer at a pressure of 20 lbs. In 10 min. more than 80% of the flies were knocked down, and more than 80% of the knocked down flies were found dead on the following day.

TEST EXAMPLE 3

About 50 adults of northern house mosquitoes (culex pipiens pallens) were released in a glass chamber, 70 cm. x 70 cm. x 70 cm. in size, and 1 gr. of each of the mosquito coils obtained in Examples 18 and 19 was placed on the central part of the bottom, and ignited at both ends. The knock down effect against said mosquito adults was observed from time to time, and more than 80% of the mosquitos were found dead in 20 min.

TEST EXAMPLE 4

The insecticidal activities of aerosols obtained in Examples 20, 21 and 22 were tested against housefly adults by use of Peet Grady's chamber for testing aerosols. [Soap and Chemical Specialties, Blue Book (1965)]. The results obtained were as shown in Table 2.

TABLE 2

| Composition | Applied rate (gr./ 1,000 ft.$^3$) | Knock-down, percent after— | | | Mortality, percent |
|---|---|---|---|---|---|
| | | 5 min. | 10 min. | 15 min. | |
| Aerosol of Example 20 | 3.0 | 25 | 71 | 92 | 84 |
| Aerosol of Example 21 | 2.9 | 32 | 78 | 96 | 93 |
| Water-based aerosol of Example 22 | 3.3 | 20 | 68 | 92 | 80 |

TEST EXAMPLE 5

Each of the emulsifiable concentrates obtained in Example 17 and the wettable powder obtained in Example 26 were diluted to 50,000 times each volume with water. 1.5 liters of each diluted emulsion was placed in a polystyrene container of 23 cm. x 30 cm. and 6 cm. in depth, and about 50 full-grown larvae of northern house mosquito were released therein. On the following day, more than 90% of the larvae were found dead.

TEST EXAMPLE 6

In a glass chamber, of 70 cm. x 70 cm. 70 cm., about 50 adults of northern house mosquito were exposed to the fumes generated by the fumigatory insecticidal composition obtained in Example 23, which was placed on an electrically heated plate. In 20 min., more than 90% of the mosquitoes were knocked down.

TEST EXAMPLE 7

The inner surface of the wall of a deep Petri dish of 14 cm. in inner diameter and 7 cm. in depth, was coated with butter except for 1 cm. from the bottom. Onto the bottom surface of each dish thus treated, each of the dust compositions obtained in Example 24 was uniformly applied at a rate of 3 gr./m.² Ten adults of German cockroach were released in each dish to contact with the insecticide for 60 min. More than 80% of the cockroaches were found knocked down in one day, and more than 90% of the cockroaches were found dead in 3 days.

TEST EXAMPLE 8

Three grams of the granular composition obtained in Example 25 was introduced into 10 l. of water in a 14 l. pail made of polyethylene. After one day, about 100 full-grown larvae of northern house mosquito were released into said water to observe the alive and dead. In 24 hrs., more than 90% of the mosquito larvae were found dead.

TEST EXAMPLE 9

About 20 rice seedlings, cultivated for 20 days after sowing in a flower pot of 8.5 cm. in diameter, were dusted by means of a bell jar duster with 300 mg. per pot of each of the dust compositions obtained in Example 24. After 4 min. of exposure, each pot was covered completely with a wire gauge, into which 20 adults of brown plant-hopper were released. In each case, more than 90% of the plant-hoppers were found dead in 24 hrs.

What is claimed is:

1. A cyclopropanecarboxylic acid ester represented by the formula,

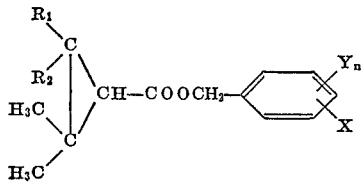

wherein when $R_1$ is hydrogen atom, $R_2$ is methyl group, isobutenyl group, or 2-carbomethoxy-1-propenyl group, and when $R_1$ is methyl group, $R_2$ is methyl group; X is a lower alkynyl group; Y is hydrogen atom, methyl group, methoxy group, or chlorine atom; and $n$ is 2; provided that the case where Y and $R_1$ are hydrogen atom, $R_2$ is isobutenyl group, and X is propargyl group is excluded.

2. The cyclopropanecarboxylic acid ester according to claim 1 wherein X is ethinyl, propargyl or butinyl group.

3. The cyclopropanecarboxylic acid ester according to claim 2, wherein X is propargyl group.

4. The cyclopropanecarboxylic acid ester according to claim 1, wherein $R_1$ is hydrogen atom and $R_2$ is isobutenyl group.

5. A compound of the formula,

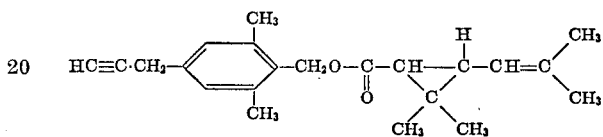

References Cited

UNITED STATES PATENTS 3,567,740   3/1971   Matsui et al. _____ 260—347.4

FOREIGN PATENTS 2,016,577   5/1970   France _____ 260—468

OTHER REFERENCES

Katsuda et al., Agr. Biol. Chem. 33, 1361 (1969).

LORRAINE A. WEINBERGER, Primary Examiner
R. GERSTL, Assistant Examiner

U.S. Cl. X.R.

260—613 D, 618 R, 618 D; 424—305, 306